US006400961B1

(12) United States Patent
Lillie et al.

(10) Patent No.: US 6,400,961 B1
(45) Date of Patent: Jun. 4, 2002

(54) METHOD AND APPARATUS FOR REDUCING THE POWER CONSUMPTION OF MOBILE MULTIMODE COMMUNICATION TERMINALS

(75) Inventors: Frank Lillie, München; Ulrich Bötzel, Kaarst; Bertram Gunzelmann, Augsburg, all of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/336,955

(22) Filed: Jun. 21, 1999

Related U.S. Application Data

(63) Continuation of application No. PCT/DE97/02918, filed on Dec. 15, 1997.

(30) Foreign Application Priority Data

Dec. 19, 1996 (DE) .......................... 196 53 106

(51) Int. Cl.$^7$ ................................. H04Q 7/20
(52) U.S. Cl. .................. 455/552; 455/422; 455/426; 455/434; 455/552; 455/574; 455/343
(58) Field of Search ................. 455/426, 434, 455/515, 458, 161.1, 161.2, 161.3, 166.1, 166.2, 168.1, 552, 553, 442, 423, 445, 38.3, 514, 574, 575, 343, 566, 444; 370/311, 340, 338

(56) References Cited

U.S. PATENT DOCUMENTS

| | | | |
|---|---|---|---|
| 4,905,301 A | * | 2/1990 | Krolopp et al. ............... 455/56 |
| 5,301,359 A | | 4/1994 | Van den Heuvel et al. |
| 5,497,505 A | | 3/1996 | Koohgoli et al. |
| 5,517,677 A | | 5/1996 | Moon |
| 5,745,850 A | * | 4/1998 | Aldermeshian et al. ...... 455/417 |
| 5,774,805 A | * | 6/1998 | Zicker ........................ 455/426 |
| 5,784,693 A | * | 7/1998 | Barber et al. ............... 455/434 |
| 5,790,946 A | * | 8/1998 | Ratzoll ........................ 455/343 |
| 5,794,146 A | * | 8/1998 | Sevcik et al. ............... 455/434 |
| 5,809,416 A | * | 9/1998 | Pinault et al. ............... 455/422 |
| 5,862,480 A | * | 1/1999 | Wild et al. ................... 455/432 |
| 5,870,389 A | * | 2/1999 | Hadar et al. ................. 370/311 |
| 5,884,168 A | * | 3/1999 | Kolev ........................ 455/432 |
| 5,893,030 A | * | 4/1999 | De Loe, Jr. et al. ......... 455/326 |
| 5,966,667 A | * | 10/1999 | Halloran et al. ............ 455/552 |
| 5,999,811 A | * | 12/1999 | Molne ........................ 455/432 |
| 6,016,427 A | * | 1/2000 | Barber et al. ............... 455/434 |
| 6,073,035 A | * | 6/2000 | Witter ........................ 455/574 |
| 6,125,283 A | * | 9/2000 | Kolev et al. ................. 455/552 |
| 6,138,010 A | * | 10/2000 | Rabe et al. ................. 455/426 |

FOREIGN PATENT DOCUMENTS

GB 2289191 A 11/1995

OTHER PUBLICATIONS

"The GSM System", XP 002038439, pp. 442–456.

* cited by examiner

*Primary Examiner*—Daniel Hunter
*Assistant Examiner*—Yemane Woldetatios
(74) *Attorney, Agent, or Firm*—Herbert L. Lerner; Laurence A. Greenberg; Werner H. Stemer

(57) ABSTRACT

A method and an apparatus for saving current in mobile multi-mode communication terminals, in which the frequency of searching (scanning) for available communication networks is varied as a function of information about the local availability of the communication networks.

12 Claims, 4 Drawing Sheets

METHOD AND APPARATUS FOR REDUCING THE POWER CONSUMPTION OF MOBILE MULTIMODE COMMUNICATION TERMINALS

CROSS-REFERENCE TO RELATED APPLICATION

This is a continuation of copending International Application PCT/DE97/02918, filed Dec. 15, 1997, which designated the United States.

BACKGROUND OF THE INVENTION

Field of the Invention

The invention relates to a method and to an apparatus for reducing power consumption in mobile multi-mode communication terminals. In this case, multi-mode refers to equipment that can be operated in various modes, and can in this way communicate via various communication networks. Dual mode would be the corresponding specific term if the equipment could communicate via two different communication networks.

As a result of the future worldwide integration of and cooperation between different communication networks for wire-free transmission of voice and data, there is a user demand to be able to use all, or at least a number, of these communication networks with one unit. In order to be able to receive all the communication networks with this one unit, and thus to be able to access them, the communication terminal has to continuously search for (scan) a plurality of networks which may be present. This leads to a scanning frequency that is higher than that with simple mobile terminals. For scanning, a plurality of hardware components of a multi-mode communication terminal, such as RF assemblies containing an amplifier, mixer, demodulator, oscillator and baseband assemblies containing a digital signal processor, processor and memory must be active and must be supplied with power. In order to allow this to be done, a number of the hardware components must be present, in a different configuration and thus repeatedly in order to satisfy the requirements of different communication networks, and the components must be supplied with power. These reasons lead to a power consumption being higher than that for communication terminals which can be accessed only within one specific communication network. This results in a shorter standby time in which the unit can be accessed without any intermediate recharging. The standby time is a critical technical parameter and an important sales criterion for mobile communication terminals.

SUMMARY OF THE INVENTION

It is accordingly an object of the invention to provide a method and an apparatus for reducing the power consumption of mobile multi-mode communication terminals which overcome the above-mentioned disadvantages of the prior art methods and devices of this general type, in which the power consumption of mobile multi-mode communication terminals can be reduced.

With the foregoing and other objects in view there is provided, in accordance with the invention, a method for reducing power consumption in mobile multi-mode communication terminals, which includes varying a frequency of searching (scanning) for available communication networks in dependence on information relating to a local availability of the communication networks.

In this case, the frequency of searching (scanning) for available communication networks is varied as a function of information about the local availability of the communication networks. It is also feasible for this information also to be reported to the multi-mode communication terminal via appropriate keys and/or by menu controled by the user.

The invention is accordingly based on the idea that all the possible different communication networks are not available in all areas and thus the hardware components, which have to be repeated more than once, in a multi-mode communication terminal, the only ones which need to be operated and supplied with power are those which are required to be accessible via the currently available communication networks.

In one embodiment of the invention, the information about which communication networks are available or are not available is signaled by the available communication networks.

Another preferred embodiment of the present invention provides for the frequency of the search processes in a self-learning process to be matched to the local availability of the communication networks.

In a further preferred embodiment of the invention, the communication terminal searches for available communication networks at time intervals, in which case the search for specific communications networks is stopped if the communication terminal finds, in regions in which an available communication network is signaling, that the search for these specific communication networks should be stopped.

A further preferred embodiment variant of the invention provides that the communication terminal searches for available communication networks at time intervals, in which case areas in which the search for specific communication networks is unsuccessful are marked, and this marking is used to stop or to limit a further or renewed search for these specific communication networks in these areas, at least until a specific time period has passed.

With the foregoing and other objects in view there is further provided, in accordance with the invention, a mobile communication terminal, including:

a communicator for communicating with a plurality of communication networks;

a scanner connected to the communicator and searching for which of the plurality of communication networks being available;

an evaluator evaluating information relating to the availability of the communication networks; and a controller controlling the scanner for searching for available communication networks in dependence on an evaluation of the information about the availability of the communication networks for reducing overall power consumption of all component parts.

Other features which are considered as characteristic for the invention are set forth in the appended claims.

Although the invention is illustrated and described herein as embodied in a method and an apparatus for reducing the power consumption of mobile multi-mode communication terminals, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
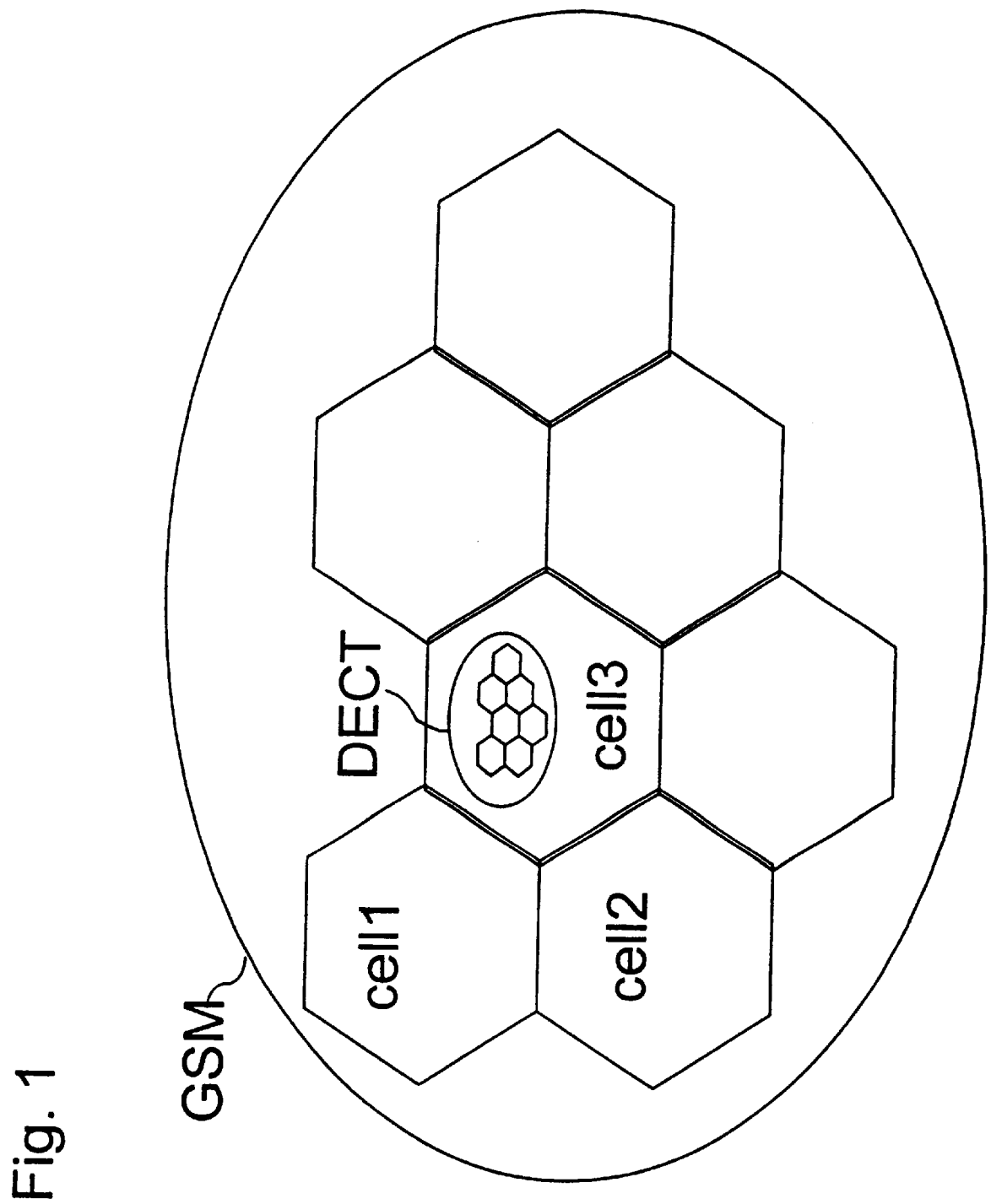
FIG. 1 is a diagrammatic, schematic of a GSM network and a DECT network.

In all the figures of the drawing, sub-features and integral parts that correspond to one another bear the same reference symbol in each case. Referring now to the figures of the drawing in detail and first, particularly, to FIG. 1 thereof, there is shown two different communication networks (GSM network, DECT network) of which both are available in some areas (cell 3) and only the GSM communication network is available in other areas (cell 1, cell 2). If a mobile dual-mode communication terminal is now intended to be accessed in both communication networks, continuous searching (scanning) for any available networks is necessary. In order to allow this to be done, a number of hardware components in the dual-mode communication terminal must be present in a different configuration, and thus in duplicated form, in order to satisfy the requirements of the two different communication networks, and must be kept in an action state and supplied with power. In order to save power, the method according to the invention now provides for the dual-mode communication terminal to use information about the respective current availability of the two communication networks in order to vary the frequency of the above-mentioned search processes. Since the power consumption is critically dependent on the frequency of the search processes, the power consumption can also be reduced by reducing the number of search processes.

One option is for the GSM network to signal information in each cell about how well the cell is covered by DECT picocells. The frequency of the search processes is in this case matched to the level of coverage. The level of coverage may in this case fluctuate between two extreme situations: if there is no DECT system in the entire GSM cell, searching for DECT networks may be entirely suppressed while, if the entire GSM cell is covered by DECT picocells, the frequency of the search processes should correspond to a maximum search rate that is technically required for continuous accessibility.

A further option is for mobile dual-mode communication terminals themselves to determine the level of coverage of the individual GSM cells by DECT picocells by evaluating the results of the search processes in the course of their life, and to store this level of coverage of the individual GSM cells. In this case, for example, each cell would be denoted by an identity number ID and each communication network by an identification number K. The result of the search for specific communication networks in specific cells is then associated with the respective identity number ID and the identification number K, and is saved in a memory apparatus. The storage may in this case either be in the individual mobile communication terminals themselves or in memory devices in the GSM network, for example in the base stations. Before each new search process, the memory is first of all checked to determine how successful a search for a specific communication network appears to be in the cell, and the search frequency is adapted accordingly. Since changes can occur in the infrastructure of the DECT networks over the course of time, the information about the level of coverage should be redetermined repeatedly at relatively long time intervals. Finally, it would also be possible for the search for GSM networks to be stopped if a DECT network is available. This would again have the advantage of power reduction and, furthermore, the advantage that the more cost-effective network would necessarily be used for communication. It is also feasible for the information about the availability of communication networks to be reported to the multi-mode communication terminal via appropriate keys and/or menu control by the user.

The exemplary embodiments described above are, however, in no way limited to GSM or DECT networks. Further exemplary embodiments according to the invention are based on the same procedure for obtaining, processing and evaluating information about the availability of communication networks as that described above. In fact, the exemplary embodiments of the invention are based on a number of communication networks or other communication networks that are available in principle. Thus, for example, a mobile multi-mode communication terminal can be envisaged which can be accessed not only via two different communication networks but via a plurality of different communication networks. These could differ by being composed of cells having a different average cell area.

A further refinement of the invention is based on the various communication networks using different transmission methods and/or transmission standards, which require different hardware components. For example, the use of the method according to the invention can be envisaged in conjunction with communication networks which are based on different multiple access methods, such as CDMA, TDMA, FDMA. Accessibility via different communication networks using different multiple access methods is predicated on the need to have more than one version of a number of hardware components corresponding to the different multiple access methods. The power consumption can be reduced owing to the fact that the only hardware components that need be supplied with power are those which ensure accessibility in the currently available communication networks. This can be achieved again by evaluating information about which communication networks, and using which multiple access methods, are currently available, and by using this information to adapt the search frequency. This information can in this case be signaled by the available communication networks, or can be determined in a self-learning process, as described above.

Figure 2:
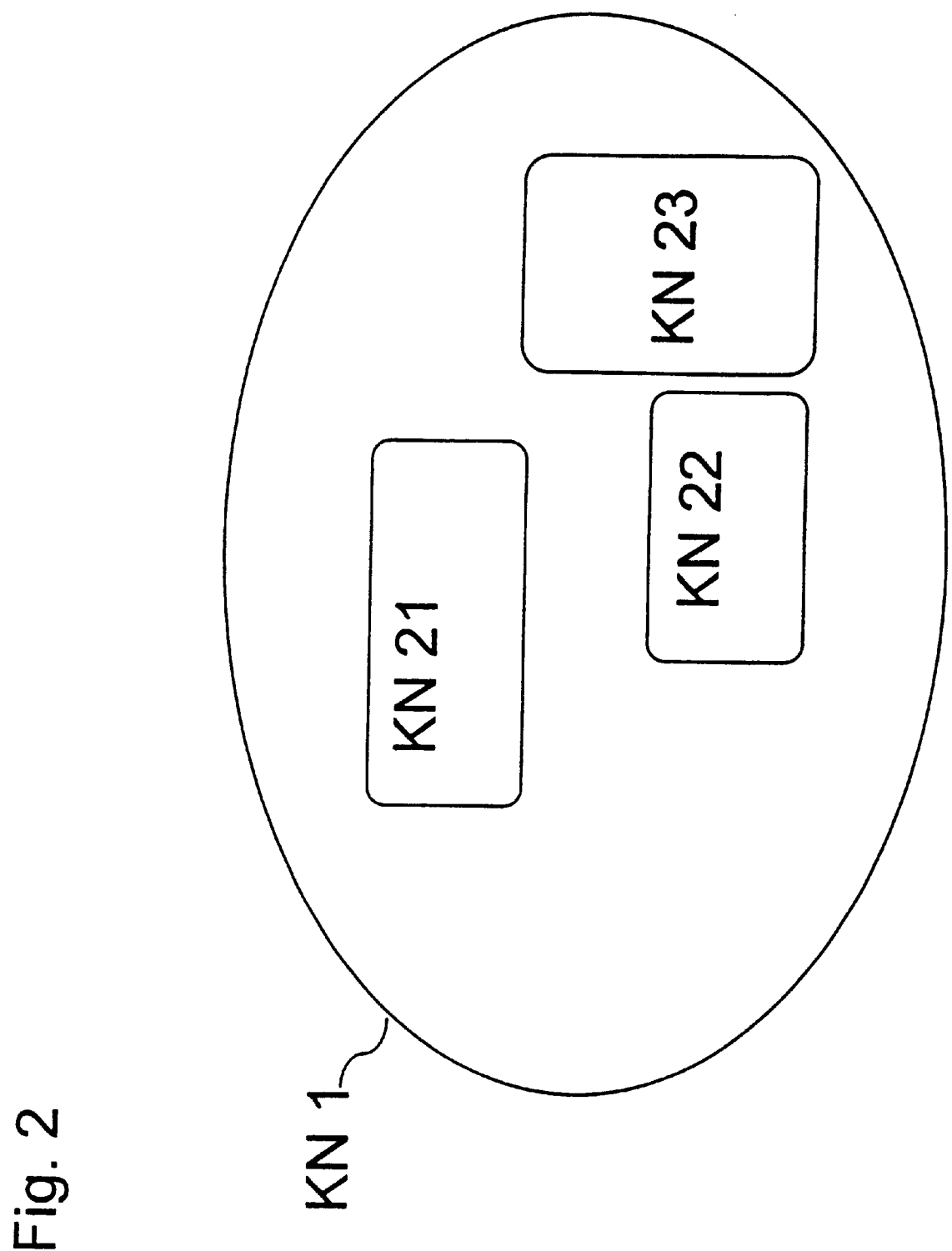
FIG. 2 is a schematic of communication networks that use different frequency bands.

Furthermore, communication networks whose signaling transmission uses different frequency bands can also be envisaged in conjunction with the invention. One refinement according to the invention that is based on this precondition will be described briefly on the basis of the following specific example of two communication networks (KN1, KN2) which use different frequency bands (F1 and F2). As is shown in FIG. 2, both of the two communication networks are available in some areas (KN21, KN22, KN23), and only KN1 is available in other areas. As explained above, a mobile dual-mode (dual-band) communication terminal now has to search (scan) continuously for any available networks in order to be accessible. In order to allow this to be done, a number of hardware components in the dual-mode communication terminal must be present in a different configuration, and thus in duplicated form, to satisfy the requirements of the two different frequency bands, and must be supplied with power. In order to save power, the method according to the invention now provides for the dual-mode communication terminal to use information about the respective current availability of the two communication networks in order to vary the frequency of the above-mentioned search processes. Since the power consumption is critically dependent on the frequency of the search processes, the power consumption can also be reduced by reducing the number of search processes.

One option would in this case be for KN1 to signal in each area information about how well this area is supplied by KN2. The frequency of the search processes is in this case matched to the level of supply. The level of supply may in this case fluctuate between two extreme situations: if the entire area is not supplied by KN2 at all, the search for KN2 can be entirely suppressed. In contrast, if the entire area is supplied by KN2, the frequency of the search processes should correspond to a maximum search rate that is technically necessary for continuous accessibility.

A further option would be for the mobile dual-mode communication terminals themselves to determine the level of supply in the individual areas by evaluating the results of the search processes in the course of their life, and to store the level of supply for the individual areas. For example, it is feasible for each area to be denoted by the identity number ID and for each communication network to be denoted by the identification number K. The result of the search for specific communication networks in specific areas is then associated with the respective identity number ID and the identification number K, and is then saved in a memory apparatus. The storage process may in this case be carried out either in the individual mobile communication terminals themselves or in the memory devices in the communication networks themselves. Before each new search process, the memory is first of all checked to determine how successful a search for a specific communication network would be in this area, and the search frequency is adapted accordingly. Since changes can occur in the infrastructure of the communication networks over the course of time, the information about the level of coverage should be re-determined repeatedly at relatively long time intervals.

Figure 3:
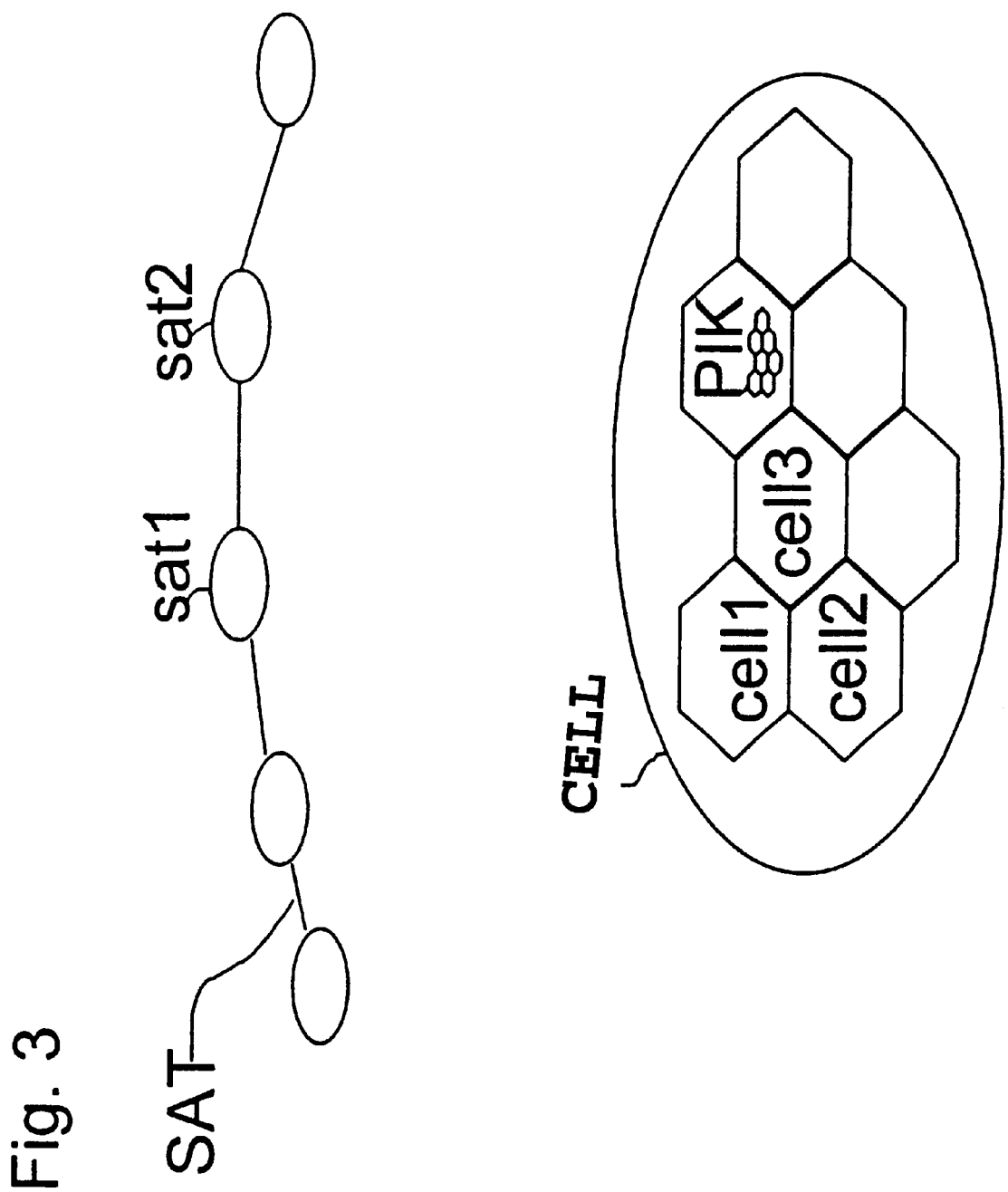
FIG. 3 is a schematic showing a picocellular network, a terrestrial cellular mobile radio network, and a satellite mobile radio network.

FIG. 3 describes three available communication networks including a picocellular network, a terrestrial cellular mobile radio network and a satellite mobile radio network. In this case, the satellite mobile radio system may be a geostationary or an LEO/MEO satellite system. For example, the satellite mobile radio system could allow roughly global supply and the cellular mobile radio system regional supply while, in contrast, the picocellular system is intended to supply individual parts of towns or specific infrastructure facilities such as airports or train stations. Accessibility via the three different communication networks in turn requires different hardware components. In this case, the available communication network (for example the satellite mobile radio system) informs the mobile multi-mode communication terminal about the local availability of the other communication networks, and thus results in the frequency of the search processes for the other networks being adapted in the manner described above. This in turn leads to a reduction in the power consumption since, once again, the only hardware components which are supplied with power are those which are required in order to be accessible via the currently available communication networks.

From the above description, the person skilled in the art may easily conceive of and configure further combinations of the exemplary embodiment described above.

One mobile communication terminal (MKE) which corresponds to the invention is provided with RF assemblies and the baseband assemblies which allow communication via a number of different communication networks (KN1, KN2). Therefore, a number of the hardware components in the multi-mode communication terminal are present in a different configuration, and thus in multiple form, to satisfy the requirements of the different communication networks. Furthermore, the unit has RF assemblies and baseband assemblies to search for currently available communication networks. The assemblies for searching for a specific communication network are already included in every commercially available mobile terminal. Furthermore, the invention envisages memories and processors which process information about the current availability of communication networks, and processors for intelligent control of the frequency of the search processes for available communication networks, with the aim of reducing the power consumption.

One refinement of the mobile multi-mode communication terminal according to the invention also envisages devices in the form of assemblies that allow the reception of information about the availability of communication networks. This information may be signaled, for example, by available communication networks.

Figure 4:
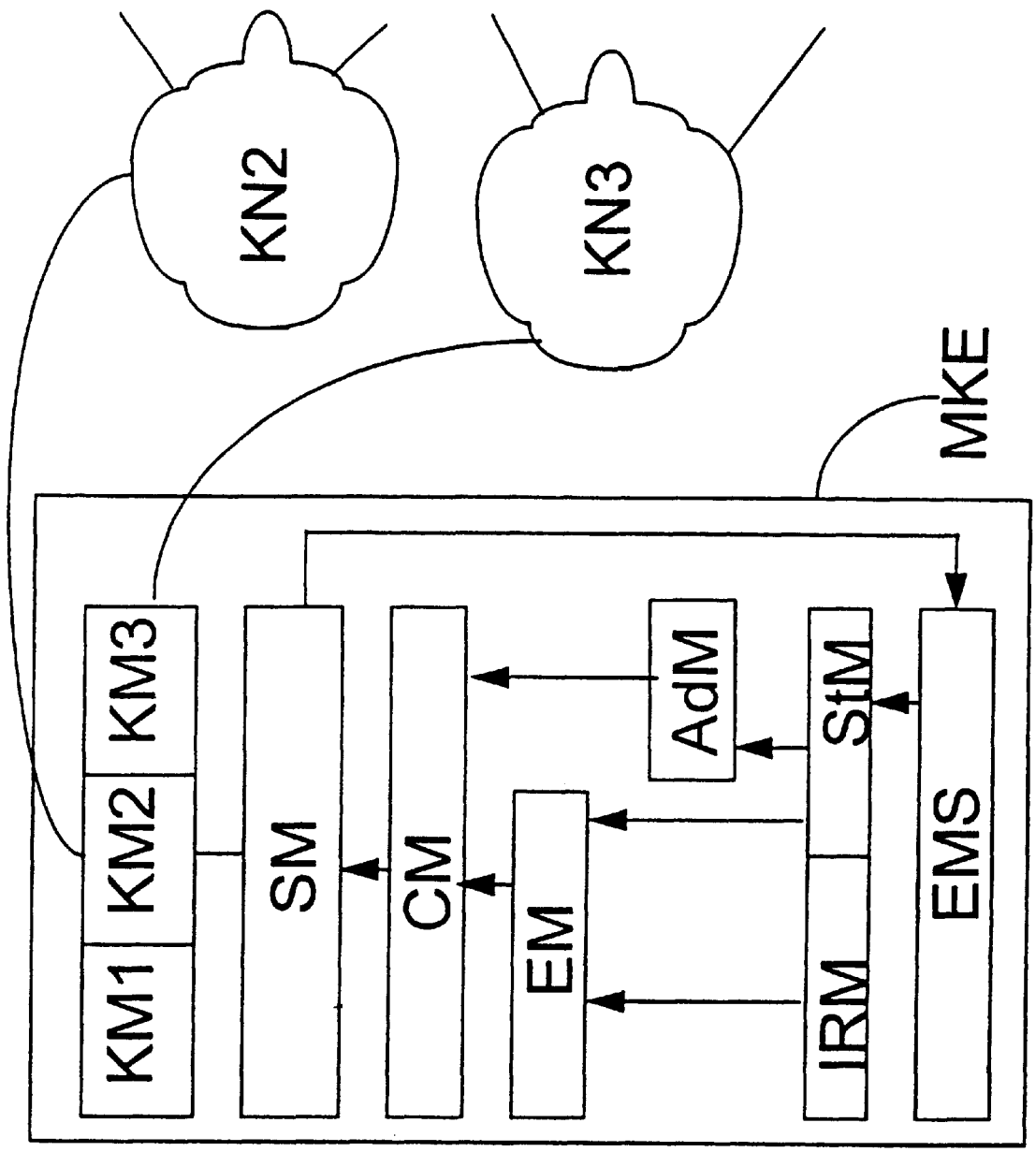
FIG. 4 is a block diagram of an advantageous embodiment of an apparatus according to the invention.

FIG. 4 shows a further development of the mobile multi-mode communication terminal according to the invention. A communicating means KM1–KM3 is provided for communicating with the communications networks KN1–KN3. A scanner SM searches for which of the communications networks KN1–KN3 are available KN2, KN3. An evaluator EMS is connected to the scanner SM for evaluating the search processes and the results are stored in a memory StM. Furthermore, a processor or controller AdM is provided for matching time intervals between the search processes of the communication networks to the results of the search processes as a function of the local area in which the communication terminal is located. To do this, each cell and/or each area may, for example, be denoted by the identity number ID, and each communication network can be denoted by the identification number K. The result of the search for specific communication networks in specific cells and/or areas is then associated with the respective identity number ID and the identification number K, and is saved in a memory apparatus. Before each new search process, the memory is first of all checked to determine how successful a search for a specific communication network K in the cell and/or the area ID would be, and the search frequency is adapted accordingly. A means for receiving information IRM is provided which receives information about the availability of the communications networks KN1–KN3. A further evaluator EM is provided for evaluating the information relating to the availability of the communication networks and to receive the scanning results. A main controller CM is provided for evaluating the results provided by the further evaluator EM and for controlling the scanner SM.

We claim:

1. A method for reducing power consumption in mobile multi-mode communication terminals, which comprises:

varying a frequency of searching for available communication networks in dependence on information relating to a local availability of the communication networks; and signaling the information about which of the communication networks are and are not available through at least one available communication network.

2. The method according to claim 1, which comprises matching a frequency of search processes in a self-learning process to the local availability of the communication networks.

3. The method according to claim 1, which comprises:

searching for the available communication networks at time intervals; and stopping the searching for one or more of the communications networks if, in areas in which an available communication network is signaling, that a search for one or more of the communication networks should be stopped.

4. The method according to claim 2, which comprises:

searching for the available communication networks at time intervals; and marking areas in which a search for one or more of the communication networks is unsuccessful, and using the marking to one of stop and limit a further, renewed search for one or more of the communication networks in the areas that have been marked at least until a specific time period has passed.

5. The method according to claim 1, which comprises operating the various communication networks using at least one of different transmission methods and transmission standards.

6. The method according to claim 1, wherein the various communication networks are formed from cells of different sizes, and the communication networks having relatively large cells signal information about which of the communications networks that have relatively small cells are available within the relatively large cells.

7. The method according to claim 1, wherein the various communication networks may be cellular networks including cellular networks in accordance with GSM Standards, and picocellular networks including picocellular networks in accordance with DECT Standards.

8. The method according to claim 1, which comprises operating the various communication networks using different multiple access methods including TDMA, FDMA, and CDMA.

9. The method according to claim 1, which comprises operating the various communication networks using different frequency bands.

10. The method according to claim 1, which comprises providing the various communication networks as terrestrial mobile radio networks and satellite mobile radio networks.

11. A mobile communication terminal, comprising:

a communicator for communicating with a plurality of communication networks;

a scanner connected to said communicator and searching for which of the plurality of communication networks are available, said scanner having a search frequency;

a receiver for reception of information signaled by a communication network about the availability of the communication networks;

an evaluator evaluating the signaled information about the availability of the communication networks; and a controller controlling said search frequency of said scanner in dependence on an evaluation of the signaled information about the availability of the communication networks to reduce overall power consumption of the mobile communication terminal.

12. The communication terminal according to claim 11, including:

a further evaluator evaluating search processes for the communication networks and search results generated by said scanner and outputting evaluated search results;

a memory for storing the evaluated search results; and a further controller for matching time intervals between the search processes for the communication networks to the evaluated search results, in dependence on a local area in which a communication terminal is located.

* * * * *